May 4, 1937.  J. R. YANCEY  2,079,195
COMBINATION VALVE AND CHOKE
Filed Dec. 19, 1933
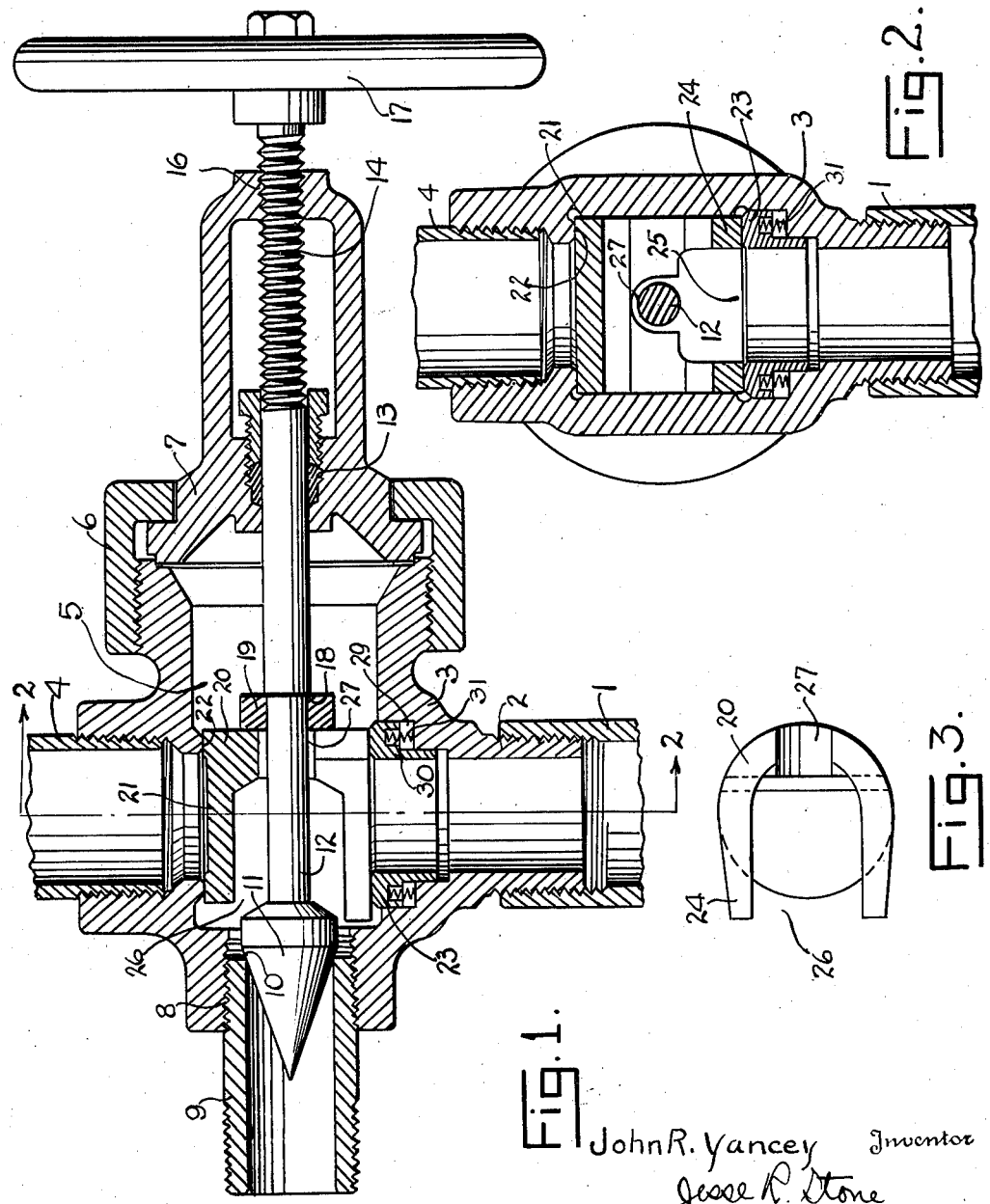
John R. Yancey, Inventor
Jesse R. Stone
Luster B. Clark
By
Attorneys Patented May 4, 1937

2,079,195

UNITED STATES PATENT OFFICE 2,079,195

COMBINATION VALVE AND CHOKE

John Richard Yancey, Houston, Tex., assignor to Gray Tool Company, Houston, Tex., a corporation Application December 19, 1933, Serial No. 703,043

12 Claims. (Cl. 277—12)

My invention relates to devices for controlling the flow of the fluid from wells, and pertains more particularly to that type of device whereby the production from a well may be controlled within prescribed limits.

In regulating the amount of fluid flowing from a well under pressure, it has been customary to choke down the size of the passage through which the fluid issues from the flow tubing by different types of valves or flow beans. One difficulty with the usual type of flow choke has been to provide a structure whereby the tubing may be left open when desired in order to introduce a swab or other tool for operating in the well.

It is an object of my invention to provide a combination of choke valve for choking down the outlet of fluid from the tubing and a gate valve for closing the opening upwardly from the tubing. I further desire to form the housing with a bonnet closing a lateral opening through which the choke valve and the gate valve may both be removed to such an extent as to allow an open passage upwardly from the tubing.

The invention contemplates a separate valve member closing the passage in the tubing and a choke for regulating the size of the fluid outlet from the tubing head and to operate both devices through a single operating means.

The invention also includes the structure of the device whereby the parts making up the same may be easily accessible for removal or repair when desired.

Another object of the invention is to provide a gate valve for use with my form of choke which will maintain a firm seat when in closed position.

Other objects and advantages lie in the particular construction and arrangement of the parts whereby the objects above set forth are accomplished.

Referring to the drawing herewith, Fig. 1 is a central longitudinal section through a device embodying my invention.

Fig. 2 is a vertical section taken on the plane 2—2 of Fig. 1.

Fig. 3 is a bottom plan view of the gate valve member which I employ.

My device is adapted to be connected in the discharge line from a well which is flowing under pressure, and may be connected directly at the upper end of the tubing leading from the well. In the drawing herewith I have shown a coupling 1 which may be connected at its lower end to the well tubing, the upper end being connected to the lower threaded member 2 upon the valve housing 3. Said valve housing has a passage upwardly therethrough for the fluid, the upper end having a pipe section 4 connected therewith which may be used as a flow line or for any desired purpose. It furnishes a means whereby tools may be lowered through the valve housing into the well for cleaning or other purposes.

The valve housing 1 has a central chamber 5 which is closed on one side by a cap or bonnet 6 threaded to the valve housing and adapted to clamp the valve stem support 7 rigidly against the valve housing.

The opposite side of the chamber 5 has an outlet into which is screwed at 8 a discharge nipple 9. The inner end of said discharge nipple forms a valve seat at 10 into which the choke valve member 11 may seat.

The choke valve or needle 11 is connected with the inner end of the valve stem 12, said stem extending laterally through the chamber 5 and through a stuffing box 13 in the valve stem support 7. The outer end of the stem is threaded at 14 to screw within a stationary nut 16 in the outer end of said support member 7. A hand wheel 17, or other similar device, is mounted on the end of the valve stem and furnishes means whereby the stem may be rotated to move the valve head 11 to and from its seat. The valve stem 12 is reduced in outer diameter at a point between its ends as shown particularly at 18, and upon the reduced inner end of the stem is mounted a ring or washer 19, which, when the choke valve is in closed position will bear against the inner end of a gate valve member 20.

The gate valve member 20 is formed with an upper wall or slide 21 which is approximately circular in shape and adapted to fit against a valve seat 22 on the wall of the valve housing about the outlet to the pipe 4. As seen in Fig. 1, when the gate valve is in position to close this outlet it will be held resiliently against its seat by a spring pressed ring 23 on the side of the valve opposite said seat.

The gate valve member 20 when viewed from the lefthand side in Fig. 1 will be approximately square in cross-section as will be seen in Fig. 2. There will be an upper wall 21 as previously noted and the lower side of the valve will be made up of two forwardly extending arms 24 which rest upon the spring pressed ring 23. Between the two arms 24 is the opening 25 through which fluid from the tubing may pass upwardly into the gate valve 20 and through the open, forward end 26 to the outlet nipple 9. The wall of the valve opposite the outlet is formed with an arcuate downwardly open recess 27 which receives valve stem 12, the stem having a loose fit in said recess. Ring 19 is adapted to bear against the wall margin about recess 27 in the manner shown in Figure 1.

The ring 23 on the lower side of the gate valve member 20 fits slidably within a recess 29 in the lower wall of the chamber 5. Its upper surface is flattened to fit against the gate valve and coiled springs 30 are fitted within recesses in the outer side of the ring and bearing against a shoulder 31 in the housing, tending to force the ring resiliently against the valve and then to hold the valve itself firmly against its upper seat 22.

In the operation of my device, it will be seen that the gate valve may be advanced to closed position by screwing the valve stem inwardly and exerting a thrust thereon through means of the slidable ring 19. The choke valve member 11 may be then moved to any desired position relative to the seat 10 so as to regulate the flow of fluid which follows a course upwardly through the tubing and through the lower part of the gate valve and outwardly to the nipple 9. When it becomes desirable to open the passage downwardly through the pipe 4 and the valve housing to the tubing, it is only necessary to unscrew the valve stem to bring the end 11 of the choke valve against the inner wall of the gate valve and thus withdraw the gate valve from its position, as shown in Fig. 1, to an open position allowing the vertical passage to be entirely unobstructed so that tools may be lowered into the well. The valve body 11 and the abutment ring 19 cooperate with the vertical wall of the body 20 to provide a lost motion operating connection between the body 20 and the valve stem 12. In case it becomes desirable to remove the gate valve or the choke valve from the housing, this may be quickly done by unscrewing the cap member 6, thus allowing the whole interior valve assembly to be removable laterally from the housing.

It will be obvious that this device may be easily and cheaply constructed and that it may be manipulated to regulate the flow of liquid through the discharge outlet in the usual manner and may be so moved without further equipment to open up a vertical passage allowing access down into the well. These features are of importance in devices of this kind, and the advantages thereof will be apparent to those skilled in the art.

Having described my invention, what I claim is:

1. A device of the character described, including a flow tubing, a valve housing thereon, a lateral outlet from said housing, a seat in said outlet, a tapered choke valve movable to and from said seat, a stem on said valve, an upper outlet in said housing, a gate valve movable to and from said upper outlet, said gate valve being movable through the movement of said choke valve and stem, said choke valve being adjustable relative to its seat independently of said gate valve.

2. A tubing, a valve housing thereon, in alignment with said tube, a lateral outlet in said housing, a choke valve movable to and from said outlet, a gate valve in said housing adapted to close the aligned passage from said valve, a stem on said choke valve, and means including said choke valve to engage and move said gate valve in said housing, said choke valve being adjustable relative to its seat independently of said gate valve.

3. A tubing, a valve housing thereon, in alignment with said tube, a lateral outlet in said housing, a choke valve movable to and from said outlet, a gate valve in said housing adapted to close the aligned passage from said housing, a stem on said choke valve, a ring slidable a limited distance on said stem and adapted to engage and move said gate valve to closed position when said choke valve is closed.

4. A housing having a lower inlet, a lateral outlet and an upper opening, a choke valve adapted to control the size of said outlet, a stem thereon, means to move said stem in said housing, a gate valve in said housing adapted to move to and from position to close said upper opening, means on said stem to close said gate valve, said choke valve being independently adjustable but movable to engage and open said gate valve after said choke valve is opened.

5. A housing having a lower inlet, a lateral outlet and an upper opening, a choke valve adapted to control the size of said outlet, a stem thereon, means to move said stem in said housing, a gate valve in said housing adapted to move to and from position to close said upper opening, a shoulder on said stem spaced from said choke valve, a ring slidable on said stem between said choke valve and said shoulder, said ring being adapted to engage and move said gate valve when said choke valve is closed.

6. A housing having a fluid passage therethrough, a lateral outlet from said passage, a gate valve movable transversely of said housing to close the downstream side of said passage, a choke valve, a stem thereon to adjust said choke valve to and from said outlet, and means on said stem to close said gate valve, when said choke valve is moved to closed position and to open said choke valve to cause a flow of fluid from said outlet while said gate valve is closed.

7. A housing having a fluid passage therethrough, a lateral outlet from said passage, a gate valve movable transversely of said housing to close the downstream side of said passage, a choke valve, a stem thereon to adjust said choke valve to and from said outlet, and means on said stem to close said gate valve, when said choke valve is moved to closed position, said choke valve being adapted to be opened without moving said gate valve to allow flow of fluid through said housing from the upstream side of said passage when said gate valve is closed.

8. A tubing head forming a housing, having a longitudinal passage therethrough, a lateral outlet from said passage, a choke valve in said housing arranged by adjustment to limit the size of said outlet, a gate valve normally closing the upper end of said passage in said housing, and a valve stem connected to move both said choke valve and said gate valve, said choke valve controlling the flow of fluid from said outlet when said gate valve is closed.

9. A device of the class described comprising a valve housing having a through passage and a lateral outlet communicating with said passage, a valve slide at one side of said outlet for controlling flow through said passage, a needle for controlling said outlet, and a lost motion operating connection between said slide and needle whereby withdrawal movement of the latter may be communicated to the former to open said passage.

10. A device of the class described comprising a valve housing having a through passage and a lateral outlet communicating with said passage, a valve slide at one side of said outlet for controlling flow through said passage, a needle for controlling said outlet, and a lost motion operating connection between said slide and needle whereby withdrawal movement of the latter may be communicated to the former to open said passage and whereby movement of the needle in closing direction may be communicated to the slide to return the latter to passage-closing position.

11. A device of the class described comprising a valve housing having a through passage and a lateral outlet communicating with said passage, a valve slide at one side of said outlet for controlling flow through said passage, and a needle for controlling said outlet, said needle upon initial unseating movement thereof moving under said slide, said slide having a portion subsequently engaged by the needle whereby the slide is caused to travel with the needle and open said passage.

12. A device of the class described comprising a valve housing having a through passage and a lateral outlet communicating with said passage, a valve slide at one side of said outlet for controlling flow through said passage, a needle for controlling said outlet, said needle upon initial unseating movement thereof moving under said slide, said slide having a portion subsequently engaged by the needle whereby the slide is caused to travel with the needle and open said passage, said housing having a recess opposite said outlet for the reception of the slide and needle.

JOHN RICHARD YANCEY.